United States Patent [19]
Vainshiein et al.

[11] 3,853,726
[45] Dec. 10, 1974

[54] METHOD OF PRODUCING ORGANOCHLOROSILANES

[76] Inventors: Boris Iosifovich Vainshiein, B. Trekhgorny perenlok, I/26, kv. 12.; Alexandr Vasilievich Zimin, Kutuzovsky prospekt, 30/32, kv. 797.; Evgeny Andreevich Chernyshov, Leninsky prospekt, 61/I, kv. 54.; Margarita Evgenievna Kurek, prospekt Vernadskogo, 95, korpus 2, kv. 274.; Alexandr Nikolaevich Polivanov, B. Akademicheskaya ulista, 21, kv. 25., all of Moscow; Ljudmila Petrovna Bogovtseva, ulitsa, Lapshenkova, 99/28., Podolsk Moskovskoi oblasti; Eduard Sergeevich Starodubtsev, Niznnedneprovskaya ulitsa, 12, kv. 18., Zaporozhie; Anatoly Ivanovich Masljukov, ulitsa 40 let Sovetskoi Ukrainy, 58, kv. 33., Zaporozhie; Vladimir Ivanovich Andreev, ulitsa Lebedeva, 4Ia, kv. 68., Zaporozhie; Miron Aronovich Ezerets, Tsentralny bulvar, 3, kv. 205.; Boris Ivanovich Zorov, ulitsa Vlasova, II, korpus I, kv. 32., Moscow, all of U.S.S.R.

[22] Filed: Jan. 2, 1973

[21] Appl. No.: 320,680

Related U.S. Application Data
[63] Continuation of Ser. No. 160,197, July 6, 1971, abandoned.

[30] Foreign Application Priority Data
July 4, 1970  U.S.S.R............................. 1447056

[52] U.S. Cl...................... 204/158 HE, 204/158 R
[51] Int. Cl................................................ B01j 1/10
[58] Field of Search.............................. 204/158 HE

[56] References Cited
UNITED STATES PATENTS
2,405,019  7/1946  Dalin............................ 204/158 HE
3,493,479  2/1970  Zimin et al................... 204/158 HE

*Primary Examiner*—Howard S. Williams
*Attorney, Agent, or Firm*—Holman & Stern

[57] ABSTRACT

A method for producing organochlorosilanes having the general formulae $RR_n'SiCl_{3-n}$ and $R''(SiR_n'Cl_{3-n})_2$, where R is an aryl, chloroaryl, fluoroaryl, fluorochloroaryl, functional aryl or heterocyclic radical; R' is an alkyl or aryl radical; R'' is arylene, chloroarylene, fluoroarylene or functional arylene; $n = 0$, 1, or 2, in which organochlorosilicohydrides or trichlorosilane having the general formula $HSiR_n'Cl_{3-n}$, where R' is the alkyl or aryl radical $n = 0$, 1, or 2 react with chlorine-containing aryl compounds having the general formulae $RCl$ or $R''Cl_2$, where R is an aryl, chloroaryl, fluoroaryl, fluorochloroaryl, functional aryl or heterocyclic radical; R'' is arylene, chloroarylene, fluoroarylene or functional arylene. The said process is carried out in the vapour phase at a temperature of not over 450°C at atmospheric pressure or at elevated pressure thus to exclude the formation of the condensation phase, under the action of the ionizing radiation. The proposed method can be used for the manufacture of the desired product with high yields in a continuous process.

6 Claims, No Drawings

METHOD OF PRODUCING ORGANOCHLOROSILANES

This a continuation of application Ser. No. 160,197, filed July 6, 1971, now abandoned.

The invention relates to methods for production of organochlorosilanes used as monomers in the manufacture of various organosilicon polymers, such as resins, rubbers, cured rubbers and various liquids possessing quite valuable specific properties.

Methods are known in the prior art by which organochlorosilanes having the general formula $RR_n'SiCl_{3-n}$ and $R''(SiR_n'Cl_{3-n})_2$, where R is aryl, chloroaryl, fluoroaryl, fluorochloroaryl, functional aryl or a heterocyclic radical; R' is an alkyl, or aryl radical; R'' is an arylene radical; chloroarylene, fluoroarylene or functional arylene; and $n = 0$, 1, or 2, are produced by the reaction between organochlorosilicohydrides or trichlorosilane, having the general formula $HSiR_n'Cl_{3-n}$, where R' and n are as described above, and chlorine-containing aryl compounds having the general formula $RDl$ or $R''Cl_2$, where R and R'' are as specified above, at a temperature of from 500–700°C (the method of thermal condensation) or with gamma-radiation in the liquid phase at a temperature of 150°–320°C and at a pressure of from 20–60 kg/sq.cm., (e.g., patents of France Pat. No. 1,415,110; West Germany Pat. No. 1,232,579; Great Britain Pat. No. 1,089,195 (C 07f) and Japan Pat. No. 504602).

The inherent disadvantage known in the prior art methods of thermal condensation is the significant irreversible reduction of the halide aryls and the chlorination of organochlorosilicohydrides or trichlorosilane and also the resinification of the reaction mixture and of the products of the reaction, which reduces the yields of the product and leads to the formation of various by-products which in some cases are difficult to separate thus interferring with further manufacture of the polymers having the required properties.

Another drawback of the known method for production of organochlorosilanes with gamma-radiation, in addition to the significant irreversible chlorination of organochlorosilicohydrides or trichlorosilane is the failure to produce heterocyclic organosilanes, for example thienylchlorosilanes, and functional aryl organochlorosilanes, for example organochlorosilylbenzonitriles; the lengthy contact (irradiation) of the reaction mixture (3–10 hours) with reasonable gamma-radiation doses is also a problem. Also the necessity of thorough purification of the reaction mixtures from oxygen and traces of sulphides as well as a significant deterioration of the process and reduction of the yields of the final product in transition from glass to metal reaction vessels manufactured from structural materials (for example from stainless steel); and the impossibility of carrying out the synthesis of organochlorosilanes in a continuous process are also problems in the prior art methods.

The object of this invention is to provide a process for the production of organochlorosilanes having the composition in accordance with the above formulae in which a practically complete interaction of the starting components is ensured resulting in the manufacture of predominantly the final product.

Another object of the invention is to rule out the purification of the starting materials from oxygen and other possible admixtures which inhibit the process, for example sulphurous compounds.

The object of the invention is also to develop a continuous process for the manufacture of organochlorosilanes which can be carried out in reaction vessels of uniform construction materials.

In accordance with these and other objects the invention resides in the reaction of organochlorosilicohydrides of trichlorosilane of the above formula with chlorine-containing aryl compounds under the action of ionizing radiation. In accordance with the invention the process is accomplished in the vapour phase at a temperature not above 450°C and at an atmospheric pressure or at an elevated pressure which prevents the formation of the condensed phase.

In this method, the chemically active particles which are formed in the process, for example, radicals, initiate a successive chain reaction in the direction of formation of the final product. In addition, since the condensation phase is absent in the reaction zone (the irradiation zone) the re-combination of radicals is reduced with the other conditions remaining the same, which also increases the radiation-chemical yield of the main product.

In order to accelerate the process to the required rate, (the contact time being countable in minutes), it is recommended that the process be carried out under irradiation with fast electrons since electron accelerators ensure the requisite doses in the reaction mixture during the above-mentioned time.

The proposed method ensures a practically complete reaction between the starting components with the predominant formation of the final product and sharply reduces the quantity of the by-products thus eliminating the purification of the starting materials from oxygen or other admixtures. The present method also ensures conditions for a continuous process at atmospheric pressure, or at elevated pressures, and in reaction vessels made of common construction materials.

The proposed method for the production of organochlorosilanes by the interaction of organochlorosilicohydrides or trichlorosilane with chlorine-containing aryl compounds is effected as follows:

Organochlorosilicohydrides or trichlorosilane having the general formula $HSiR_n'Cl_{3-n}$, where R' is an alkyl or aryl radical; $n = 0$, 1, or 2, and chlorine-containing aryl compounds having the general formula $RCl$ or $R''Cl_2$, where R is aryl, chloroaryl, fluoroaryl, fluorochloroaryl, functional aryl, or a heterocyclic radical; R'' is arylene, chloroarylene, fluoroarylene, or a functional arylene, are used as the starting components.

The initial materials do not require purification from oxygen or other possible materials, such as sulphurous compounds. The starting components are transferred into the vapour phase and treated with the ionizing radiation at temperatures high enough to maintain both components in the vapour state, but not above 450°C.

Any source of the ionization radiation may be used to initiate the reaction (gamma, beta, fast electrons, etc.). In accordance with the invention, organochlorosilanes can be produced preferably with electron accelerators, since intense doses emitted from the electron currents (from fractions of a megarad per second and over) ensure an intense process which is complete within minutes.

In order to convert the starting components into the vapour state, they are heated to the temperature at which they naturally vapourize at atmospheric pressure, then the pressure is elevated to the specified magnitude for the reaction to occur. Since the boiling points of the starting materials are different, the optimum temperatures at which they can be transferred to the vapour state also differ. For example, phenyltrichlorosilane can be synthesized at a temperature of 150°–300°C, whereas the temperature required for the synthesis of trichlorosilylbenzonitrile is about 450°C, since the boiling point of chlorobenzonitrile is some 100°C higher than that of chlorobenzene.

The vapourized starting materials are passed through the zone of irradiation at atmospheric pressure or at a sufficiently high pressure which prevents condensation and ensures the delivery of the vapours and their passage through the appropriate reaction apparatus. The simpliest method is to carry out the process at atmospheric pressure since the product can be collected in a receptacle which is also working at atmospheric pressure.

The reaction between the starting materials in the reaction zone can be both intermittent and continuous. The reaction can be easily effected in a single-step continuous process on any suitable scale, the commercial scale included.

The process for production of organochlorosilanes, according to the invention, is carried out in apparatus of suitable construction material so as to withstand irradiation, elevated temperature and which is inactive toward chlorosilanes and dry hydrogen chloride (glass, quartz, ceramic, stainless steel, and other materials).

As a result of the reaction between organochlorosilicohydrides or trichlorosilane with chlorine-containing aryl compounds, a wide range of organiosilanes are produced, these having the general formulae $RR_n'SiCl_{3-n}$ and $R''(SiR_n'Cl_{3-n})_2$, where R, R', R'' and n are defined above.

The examples which follow hereinafter are given by way of illustration of the proposed method.

EXAMPLE 1.

Preparation of Phenyltrichlorosilane

A mixture of trichlorosilane and chlorobenzene is prepared having a molar ratio of 1:1 and transferred into a vapor phase heating to 300°C, and then passing the vapours at the same temperature and at atmospheric pressure through a reaction vessel irradiated with high speed electrons having an energy level of 2.5 Mev. in a continuous process. The reaction vessel material should be of stainless steel or glass.

In carrying out a similar experiment under static conditions the starting components are placed into an ampoule and converted to vapours at a temperature of 300°C and irradiated with high speed electrons or gamma-radiation. Depending on the quantities of the starting materials in the ampoule, the pressure inside it may rise from 1 to 10 kg/sq.cm. In both cases the irradiation dose with fast electrons is about 10 Mrad, whereas the dose of gamma-radiation is about 5 Mrad. The yield of phenyltrichlorosilane is about 75 percent (w/w) with reference to the condensate and about 90 percent (w/w) if the non-reacted starting components are reused.

EXAMPLE 2.

Preparation of Methylphenyldichlorosilane

Transfer methyldichlorosilane and chlorobenzene taken at a molar ratio of 1:1 into the vapour state and irradiate in conditions described in Example 1. The yield of methylphenyldichlorosilane is to 60 percent (w/w) with reference to the condensate and to 80 percent (w/w) if the non-reacted components are reused.

EXAMPLE 3.

Preparation of Methyldichlorophenyldichlorosilane

A mixture of methyldichlorosilane and 1,2,4-trichlorobenzene taken in a molar ratio of 1:1 are transferred into the vapour state and irradiated in an ampoule under the conditions specified in Example 1. The yield of methyldichlorophenyldichlorosilane is 50 percent (w/w) with respect to the condensate.

EXAMPLE 4.

Preparation of Ortho-Trichlorosilyldiphenyl

A mixture of trichlorosilane and ortho-chlorodiphenyl taken at a ratio of 1:1 are converted into vapour by heating same to a temperature of 450°C and irradiated at this temperature according to the conditions specified in Example 3. The yield of ortho-trichlorosilyldiphenyl is about 80 percent (w/w) with respect to the condensate.

EXAMPLE 5.

Preparation of meta-Trifluoromethylphenyltrichlorosilane

A mixture of trichlorosilane and meta-chlorobenzotrifluoride taken at a molar ratio of 1:1 are transferred into the vapour state and irradiate according to the conditions as specified in Example 3. The yield of meta-trifluoromethylphenylchlorosilane is about 80 percent (w/w) with respect to the condensate.

EXAMPLE 6.

Preparation of 2-trichlorosilylthiophene

A mixture of trichlorosilyl and 2-chlorothiophene taken at a molar ratio of 1:1 is vaporized and irradiate under the conditions specified in Example 3. The yield of 2-trichlorosilylthiophene is about 80 percent (w/w) with respect to the condensate.

EXAMPLE 7.

Preparation of ortho-Trichlorosilylbenzonitrile

A mixture of trichlorosilane and ortho-chlorobenzonitrile taken at a molar ratio of 1:1 is vaporized at a temperature of 400°–450°C and irradiated at this temperature under the conditions specified in Example 3. The yield of ortho-trichlorosilylbenzonitrile is about 50 percent (w/w) with reference to the condensate.

EXAMPLE 8.

Preparation of methylpentafluorophenyldichlorosilane

A mixture of methyldichlorosilane and pentafluorochlorobenzene taken at a molar ratio of 1:1 is transferred into the vapour state at a temperature of from 150°–200°C and irradiated at this temperature under the conditions specified in Example 3. The yield of methylpentafluorophenyldichlorosilane is about 60 percent (w/w) with reference to the condensate.

EXAMPLE 9.

Preparation of 1,4-bis(trichlorosilyl)benzene

A mixture of trichlorosilane and para-dichlorobenzene taken at a molar ratio of 2:1 is transferred into the vapour state and irradiated under the conditions specified in Example 3. The yield of 1,4-bis(trichlorosilyl)benzene is about 80 percent (w/w) with reference to the condensate.

EXAMPLE 10.

Preparation of 1,4-bis(methyldichlorosilyl)benzene

A mixture of methyldichlorosilane and para-dichlorobenzene taken at a molar ratio of 2:1 is transferred into the vapour state and irradiated under conditions specified in Example 3. The yield of 1,4-bis(methyldichlorosilyl)benzene is about 50 percent (w/w) with reference to the condensate.

EXAMPLE 11.

Preparation of 1,4-bis(dimethylchlorosilyl)benzene

A mixture of dimethylchlorosilane and para-dichlorobenzene taken at a molar ratio of 2:1 is transferred into the vapour state and irradiated under the conditions specified in Example 3. The yield of 1,4-bis(dimethylchlorosilyl)benzene is about 25 percent (w/w) with reference to the condensate.

In addition to the compounds described in the above examples the proposed method may be used for the manufacture of other compounds which are of great practical significance, namely, diphenyldichlorosilanee, o-chlorophenyldichlorosilane, 1,4-bis(diphenylchlorosilyl)benzene, 1,4-bis(phenyldichlorosilyl)benzene, bis(trichlorosilyl)tetrafluorobenzene, bis(dimethylchlorosilyl)tetrafluorobenzene, bis(methyldichlorosilyl)tetrafluorobenzene, pentafluorophenyltrichlorosilane, trichlorosilyldichlorobenzene, p-dimethylchlorosilylchlorobenzene, 2,5-bis(trichlorosilyl)thiophene, 2-methyldichlorosilylthiophene, α-trichlorosilylnaphthalene, α-methyldichlorosilylnaphthalene, methyldichlorosilylbenzonitrile, methyltrifluoromethylphenyldichlorosilane and others.

What is claimed is:

1. A method of producing organochlorosilanes having the general formulae $RR_n'SiCl_{3-n}$ and $R''(SiR_n'Cl_{3-n})_2$, where R is a radical selected from the group consisting of aryl, chloroaryl, fluoroaryl, fluorochloroaryl, functional aryl and heterocyclic radical; R' is a radical selected from the group consisting of the alkyl and aryl radicals; R'' is a radical selected from the group consisting of arylene, chlorarylene, fluoroarylene and functional arylene; and $n = 0, 1,$ or 2, which comprises reacting a compound selected from the group consisting of organochlorosilicohydrides and trichlorosilane having the general formula $HSiR_n'Cl_{3-n}$, where R' is a radical selected from the group consisting of alkyl and aryl radicals; and $n = 0, 1,$ or 2, with chloride-containing compounds selected from the group consisting of compounds of the general formula RCl and general formula $R''Cl_2$, where R is a radical selected from the group consisting of aryl, chloroaryl, fluoroaryl, fluorochloroaryl, functional aryl and heterocyclic radicals; R'' is a radical selected from the group consisting of arylene, chlorarylene, fluoroarylene and functional arylene; the said process being carried out in the vapor phase at a temperature of not above 450°C at a atmospheric pressure and under the action of ionizing radiation selected from the group consisting of high speed electrons, gamma radiation and beta radiation.

2. A method as claimed in claim 1, wherein the components are reacted under high speed-electron radiation.

3. A method as claimed in claim 1, wherein the components react under the action of gamma radiation.

4. A method for production of organochlorosilanes having the general formulae $RR_n'SiCl_{3-n}$ and $R''(SIR_n'Cl_{3-n})_2$, where R is a radical selected from the group consisting of the aryl, chloroaryl, fluoroaryl, fluorochloroaryl, functional aryl and heterocyclic radicals; R' is a radical selected from the group consisting of the alkyl and aryl radicals; R'' is a radical selected from the group consisting of arylene, chlorarylene and functional arylene; and $n = 0, 1,$ or 2, which comprises reacting a compound selected from the group consisting of organochlorosilicohydrides and trichlorosilane having the general formula $HSiR_n'Cl_{3-n}$, where R' is a radical selected from the group consisting of the alkyl and aryl radicals; and $n = 0, 1,$ or 2, with chlorine-containing compounds selected from the group consisting of compounds having the general formula RCl and the general formula $R''Cl_2$, where R is a radical selected from the group consisting of the aryl, chloraryl, fluoroaryl, fluorochloroaryl, functional aryl and heterocyclic radicals; R'' is a radical selected from the group consisting of arylene, chlorarylene, fluoroarylene and functional arylene; the said process being carried out in the vapour phase at a temperature of not above 450°C at elevated pressure which excludes the formation of the condensation phase, under the action of ionizing radiation selected from a group consisting of gamma rays and high speed electrons.

5. A method as claimed in claim 4, wherein the components react under the action of high speed electron radiation.

6. A method as claimed in claim 4, wherein the components react under the action of gamma radiation.

* * * * *